United States Patent
Hamada et al.

(10) Patent No.: US 9,257,934 B2
(45) Date of Patent: Feb. 9, 2016

(54) APPARATUS FOR PARALLEL OPERATION OF PULSE-WIDTH MODULATION POWER CONVERTERS

(71) Applicant: MEIDENSHA CORPORATION, Tokyo (JP)

(72) Inventors: Shizunori Hamada, Numazu (JP); Toshimichi Takahashi, Ota (JP)

(73) Assignee: MEIDENSHA CORPORATION, Tokyo (JP)

( * ) Notice: Subject to any disclaimer, the term of this patent is extended or adjusted under 35 U.S.C. 154(b) by 26 days.

(21) Appl. No.: 14/371,657

(22) PCT Filed: Dec. 11, 2012

(86) PCT No.: PCT/JP2012/082055
§ 371 (c)(1),
(2) Date: Jul. 10, 2014

(87) PCT Pub. No.: WO2013/105382
PCT Pub. Date: Jul. 18, 2013

(65) Prior Publication Data
US 2014/0334204 A1 Nov. 13, 2014

(30) Foreign Application Priority Data
Jan. 12, 2012 (JP) ................................. 2012-003739

(51) Int. Cl.
H02M 7/48 (2007.01)
H02P 27/08 (2006.01)
H02M 7/493 (2007.01)

(52) U.S. Cl.
CPC ............. H02P 27/085 (2013.01); H02M 7/493 (2013.01)

(58) Field of Classification Search
CPC .................. H02M 7/49; H02M 7/493; H02M 2007/53876

USPC ................. 363/16–17, 34–39, 41, 64, 65, 71; 318/268, 603, 610
See application file for complete search history.

(56) References Cited

U.S. PATENT DOCUMENTS

| 5,253,155 A | 10/1993 | Yamamoto |
| 5,325,285 A * | 6/1994 | Araki ................... H02J 3/46 307/51 |

(Continued)

FOREIGN PATENT DOCUMENTS

| JP | 4-312324 A | 11/1992 |
| JP | 5-30661 A | 2/1993 |

(Continued)

OTHER PUBLICATIONS

Suda, Nobuhide "PID Control", Asakura Publishing Co., Ltd., Jul. 1, 1992, pp. 51-53.

*Primary Examiner* — Rajnikant Patel
(74) *Attorney, Agent, or Firm* — Foley & Lardner LLP (57) ABSTRACT

To perform an anti-windup control without interference with a cross current compensating function even in case of voltage saturation.
There is provided a feedback value calculating section to calculate an average of voltage commands V1_cmd, V2_cmd after output limitation, as a feedback value. As a deviation used for an integral calculation of a current control section 6a, 6b, a sum obtained by adding a product to a deviation between a current command value Id_cmd, Iq_cmd and a current detection value Id_det, Iq_det is used. The product is a quantity obtained by multiplying a saturation quantity by a feedback gain Kfb. The saturation quantity is a saturation quantity of an operation quantity limited by a voltage command limiting section 3a, 3b, and the saturation quantity is a deviation or difference between a feedback value V_fb (Vd_fb, Vq_fb) and the voltage command Vd_cmd.

4 Claims, 7 Drawing Sheets

(56) References Cited

U.S. PATENT DOCUMENTS

| | | | | |
|---|---|---|---|---|
| 5,390,102 A | * | 2/1995 | Araki | H02J 3/46 363/71 |
| 5,446,645 A | * | 8/1995 | Shirahama et al. | H02J 3/46 307/58 |
| 7,184,282 B2 | * | 2/2007 | Ohshima et al. | H02M 7/5387 363/40 |
| 7,327,588 B2 | * | 2/2008 | Ollila | H02M 7/493 363/71 |

FOREIGN PATENT DOCUMENTS

| | | |
|---|---|---|
| JP | 10-248262 A | 9/1998 |
| JP | 2003-134832 A | 5/2003 |
| JP | 2007-252144 A | 9/2007 |
| JP | 2012-244674 A | 12/2012 |

* cited by examiner

APPARATUS FOR PARALLEL OPERATION OF PULSE-WIDTH MODULATION POWER CONVERTERS

TECHNICAL FIELD

The present invention relates to an operation method or technique for operating power converters using PWM control, and more specifically to operation at the time of voltage saturation in the case of parallel connection of power converters.

BACKGROUND ART

In order to increase the capacity of a power conversion system such as a motor drive apparatus, there is a need for increasing the capacity of a power converting apparatus. One known technique for increasing the capacity of the power converting apparatus is arranged to operate a plurality of power converters in parallel connection and to provide, to a motor, a sum of output powers of the power converters.

In one technique for the parallel operation of power converters, power converters are connected, through one or more reactors or interphase reactors, with a motor. In the case of a common power source common to the parallel connected power converters, there arises a voltage difference due to nonuniformity in switching characteristic among the power converters since each power converter is electrically connected. This voltage difference causes an unwanted circulating current among the power converters, and this circulating current is called "cross current".

Hereinafter, in this description, a system assumed is a PWM power converter parallel running apparatus which has parallel inverters and a cross current compensating function, and which is arranged so that voltage saturation may occur.

Figure 5:
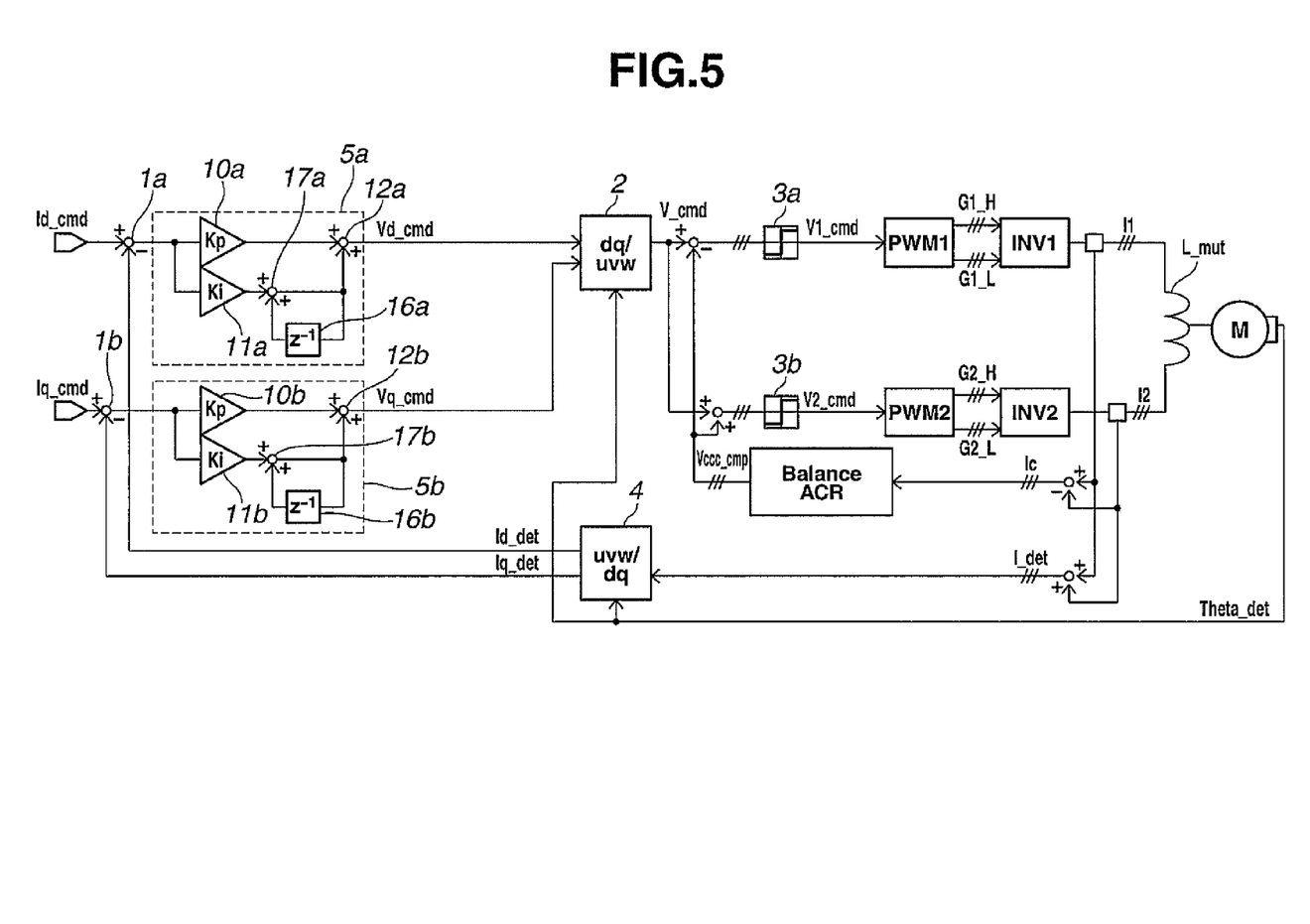
FIG. 5 is a block diagram showing one example of a general PWM power converter parallel running apparatus.

FIG. 5 is a block diagram showing one example of a general PWM power converter parallel running or driving apparatus. In FIG. 5, a mark of three slashes indicates that a signal line is for three phases.

In the PWM power converter parallel running apparatus shown in FIG. 5, inverters INV1 and INV2 are connected in parallel, and connected with an electric motor M through interphase reactor(s) L_mut. In this case, a current control is largely divided into an output current control and a cross current control.

For the output current control, a deviation between a current command value or quantity Id_cmd, Iq_cmd and a current detection value or quantity Id_det, Iq_det is obtained, a PI control is performed by output current control sections 5a and 5b, and a dq inverse transformation is performed by a dq inverse transformer 2.

For the cross current control, a cross current compensating command value or quantity Vccc_cmp calculated by a cross current compensating section BalanceACR is superimposed or overlapped on a voltage command V_cmd outputted from the dq inverse transformer 2, and voltage command limitation is imposed by current command limiting sections 3a and 3b with output limit values of inverters INV1 and INV2. Voltage commands V1_cmd and V2_cmd are voltage commands after this voltage command limitation. On the basis of these after-limitation voltage commands V1_cmd and V2_cmd, PWM generating sections PWM1 and PWM2 deliver switching commands G1_H, G1_L, G2_H and G2_L to inverters INV1 and INV2, and thereby operate the motor M by driving the inverters INV1 and INV2 in this way.

An output current I_det of the overall system is measured by sensing inverter output currents I1 and I2 and adding these inverter output currents. Since the output current I_det is a three-phase current, a dq transformer 4 performs a dq transformation for performing the output current control, and delivers the current detection values Id_det and Iq_det. This dq transformation utilizes a phase Theta_det sensed by a sensor such as an encoder.

PRIOR ART LITERATURE

Patent Document(s)

Patent Document 1: JP2003-134832 A
Patent Document 2: JP H10-248262 A
Patent Document 3: JP2007-252144 A
Patent Document 4: JP 2011-110114

Nonpatent Document(s)

Nonpatent Document 1:
SUDA, Nobuhide "PID control", Asakura Publishing Co., Ltd., Jul. 1, 1992, pp 51~53

SUMMARY OF THE INVENTION

The PWM power converter parallel running apparatus as shown in FIG. 5 is unable to hold the linearity of the output voltage when the voltage commands V_cmd−Vccc_cmd, V_cmd+Vccc_cmd become so great as to reach the voltage limit values of voltage command limiting sections 3a and 3b. Moreover, if the voltage is generated forcibly, the time of limitation of the voltage limit values is increased, and hence, the current loses the linearity so that the operation becomes unstable.

This is because the output current control includes an integral action. Specifically, the operation quantity increases in proportion to the integral quantity of the deviation (between the current command value and the current detection value. However, if the output voltage is limited, the deviation is not decreased, and the integral control action is carried out excessively so as to amplify the voltage commands Vd_cmd and Vq_cmd. As a result, the linearity of the current is lost. This phenomenon is called "windup".

Figure 6A:
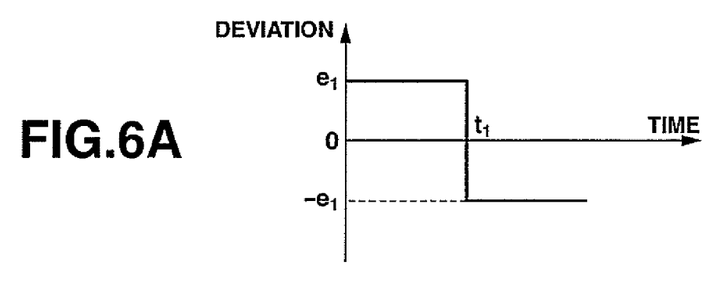
FIG. 6 is a graphic view showing a relationship between the deviation at the time of integral action, and the operation quantity.
Figure 6B:
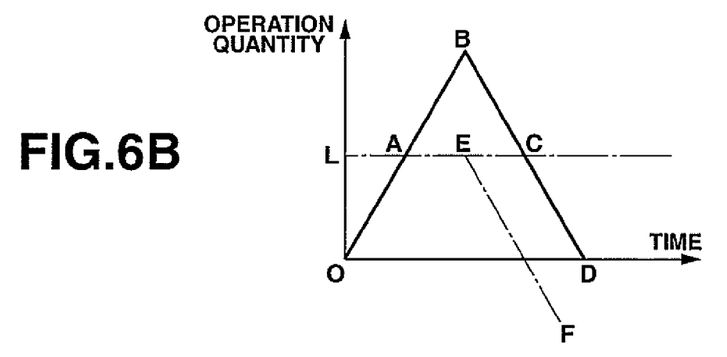

For simplification, only the integral action is taken in an open loop, and a behavior is considered in the case of the input in the form of the deviation varying as shown in FIG. 6A. If there is no saturation characteristic, the operation quantity is varied along a route OABCD, as shown in FIG. 6B. The integral action functions in its original form in which the operation quantity increases proportionally when the integral quantity of the deviation increases and the operation quantity decreases proportionally when the integral quantity of the deviation decreases. When, on the other hand, the operation quantity is saturated at a value L shown in FIG. 6B, the output of the integrator is varied still along the route OABCD, but the actual operation quantity is varied along a route OAECD. In the segment AE, the original function is lost in which the operation quantity is increased in proportion to an increase of the integral quantity of the deviation. This loss is an unavoidable loss caused by the saturation. In the segment EC, despite a decrease in the integral quantity of the deviation, the operation quantity is not decreased. This is because the output of the integrator is wound up along the segment AB (windup), and hence the proper function of decreasing the operation quantity in proportion to a decrease of the integral quantity of the deviation is not recovered until the output of the integrator is rewound along the segment BC. Although the open loop is taken for the above explanation, the operation quantity is varied in the same manner in the case of the feedback control system. The recovery of the proper function is delayed during the rewinding interval. Therefore, the settling of the deviation is delayed and the overshoot tends to increase (cf. non-patent document 1). When the current is observed along a frequency axis at the time of occurrence of windup, an offset of wide bandwidth from several Hz to several hundreds Hz is involved. Thus, the current includes various unintended oscillationss.

If the current is oscillating in the case of an apparatus which may be an inductive apparatus or a synchronous apparatus, the torque oscillate or vibrates likewise. Often, an inverter is connected with an inductive load such as a synchronous apparatus. In many cases, the synchronous apparatus is not used alone, but the output of the electric motor is connected with another mechanical system which may have a machine resonance frequency. If the unintended torque vibration becomes equal to the machine resonance frequency, the torque at this frequency is amplified, and the machine system might be damaged. Therefore, the PWM converter parallel running apparatus requires a control configuration to prevent unwanted current oscillations and torque vibrations despite continuation of voltage saturation.

Figure 7:
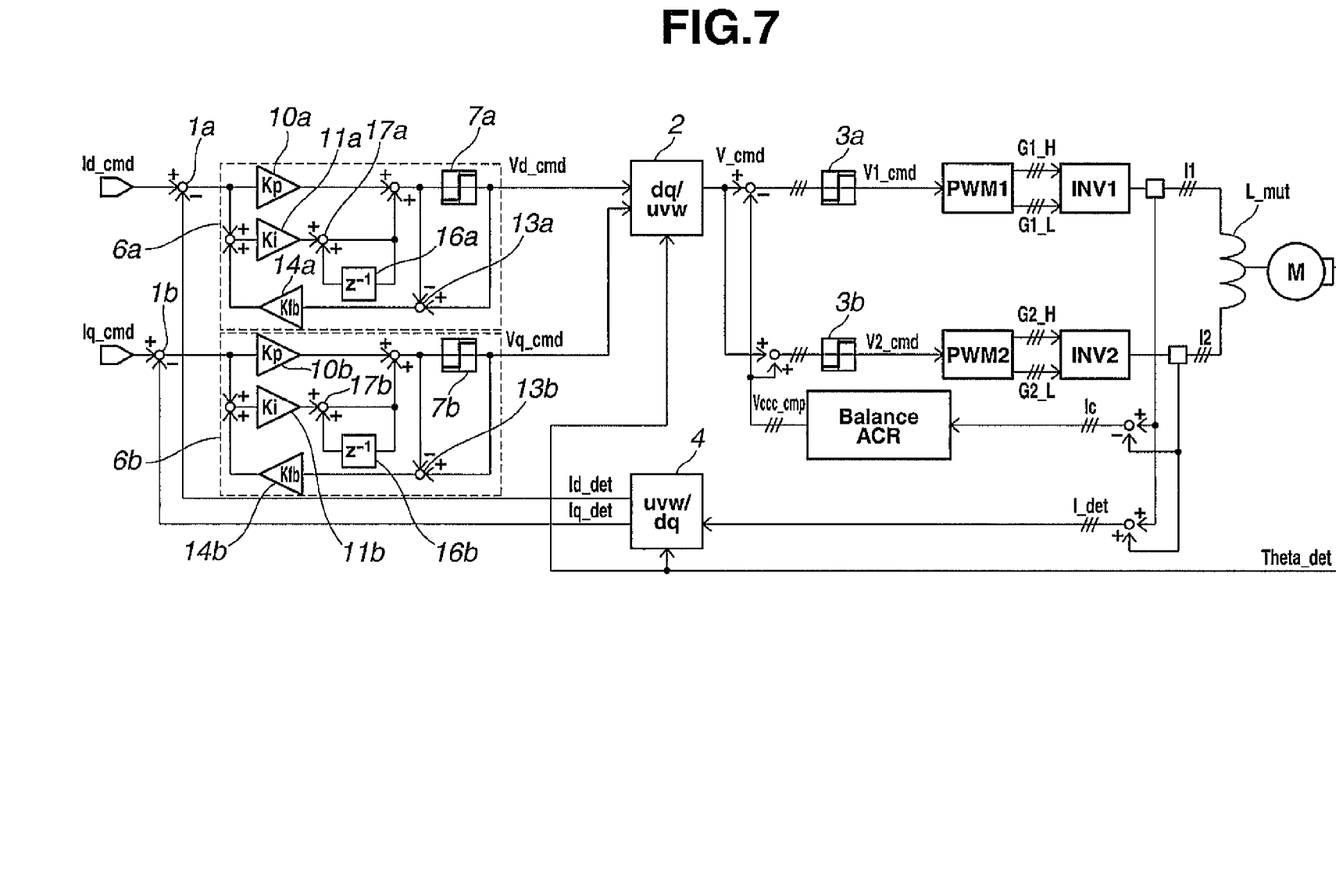
FIG. 7 is a block diagram showing a PWM power converter parallel running apparatus taking no account of the cross current compensating function and performing the anti-windup process.

FIG. 7 shows an anti-windup processing technique taking no account of cross current compensation. In the configuration of FIG. 7, the output current control sections 5a and 5b in the PWM converter parallel running apparatus shown in FIG. 5 are changed to auto-adjusting type output current control sections 6a and 6b. In the other respects, the configuration of FIG. 7 is the same as the configuration of FIG. 5.

Each of the output current control sections 6a and 6b are characterized in that the difference between the d axis or q axis voltage command before the limitation of voltage command limiting section 7a or 7b and the d axis or q axis voltage command Vd_cmd or Vq_cmd after the limitation of voltage command limiting section 7a or 7b is fed back into the output current control section 6a or 6b. When the d axis or q axis voltage command before the voltage command limitation and the d axis or q axis voltage command after the voltage command limitation are equal to each other, this feedback is cut off, so that the normal PI control is effected.

Since reset windup is generated because of too much increase of the integral action, the system performs the auto adjusting PI control restraining the integral action, and decreases the operation quantity due to the integration in accordance with the amount of the operation quantity cut off by the saturation. Consequently, the system can improve the operation quantity and the response, and improve the settling time.

However, the output current control is performed on the d and q axes, and if the anti-windup process of the output current is performed without modification, the system cannot provide normal operation. Because a cross current compensating command value Vcc_cmp is superimposed on the voltage command V_cmd after the conversion to the three-phase voltage, and the voltage command limitation is performed, eventually there is a possibility of voltage saturation, and the anti-windup process is not operated properly.

As explained above, a task is to provide a PWM power converter parallel running apparatus capable of performing the anti-windup process without interfering with the cross current compensating function even in case of voltage saturation.

The present invention is devised in view of the above-mentioned problem in the earlier technology. According to one aspect, a PWM power converter parallel running apparatus is apparatus for synchronously operating or driving a plurality of PWM power converters having outputs connected in parallel. The PWM power converter parallel running apparatus comprises a current control section, a cross current compensating section, a voltage command limiting section and a feedback value or quantity calculating section. The current control section is a section to perform an integral calculation or integration of a deviation between a current command value or quantity and a current detection value or quantity, and thereby to output a voltage command. The cross current compensating section is a section to perform a cross current compensation to the voltage command in accordance with a deviation or difference of output currents of the PWM power converters, and thereby to output a voltage command of each PWM power converter. The voltage command limiting section is a section to impose output limitation on the voltage command of each PWM power converter. The feedback value or quantity calculating section is a section to calculate an average of the voltage commands after the output limitation, as a feedback value or feedback quantity. The current control section is arranged to use, as the deviation used for the integral calculation, a sum obtained by adding a product to the deviation between the current command value or quantity and the current detection value or quantity. The product is a quantity obtained by multiplying a saturation quantity by a feedback gain. The saturation quantity is a saturation quantity of an operation quantity limited by the voltage command limiting section, and the saturation quantity is a deviation or difference between the feedback value or quantity and the voltage command.

Furthermore, it is optional to subtract a zero phase voltage from the voltage command, and/or to add a dead time compensating value or quantity.

According to the present invention, in the PWM power converter parallel running apparatus, it is possible to perform an anti-windup control properly without interference with a cross current compensating function, even in case of voltage saturation.

MODE(S) FOR CARRYING OUT THE INVENTION

Embodiment 1

Figure 1:
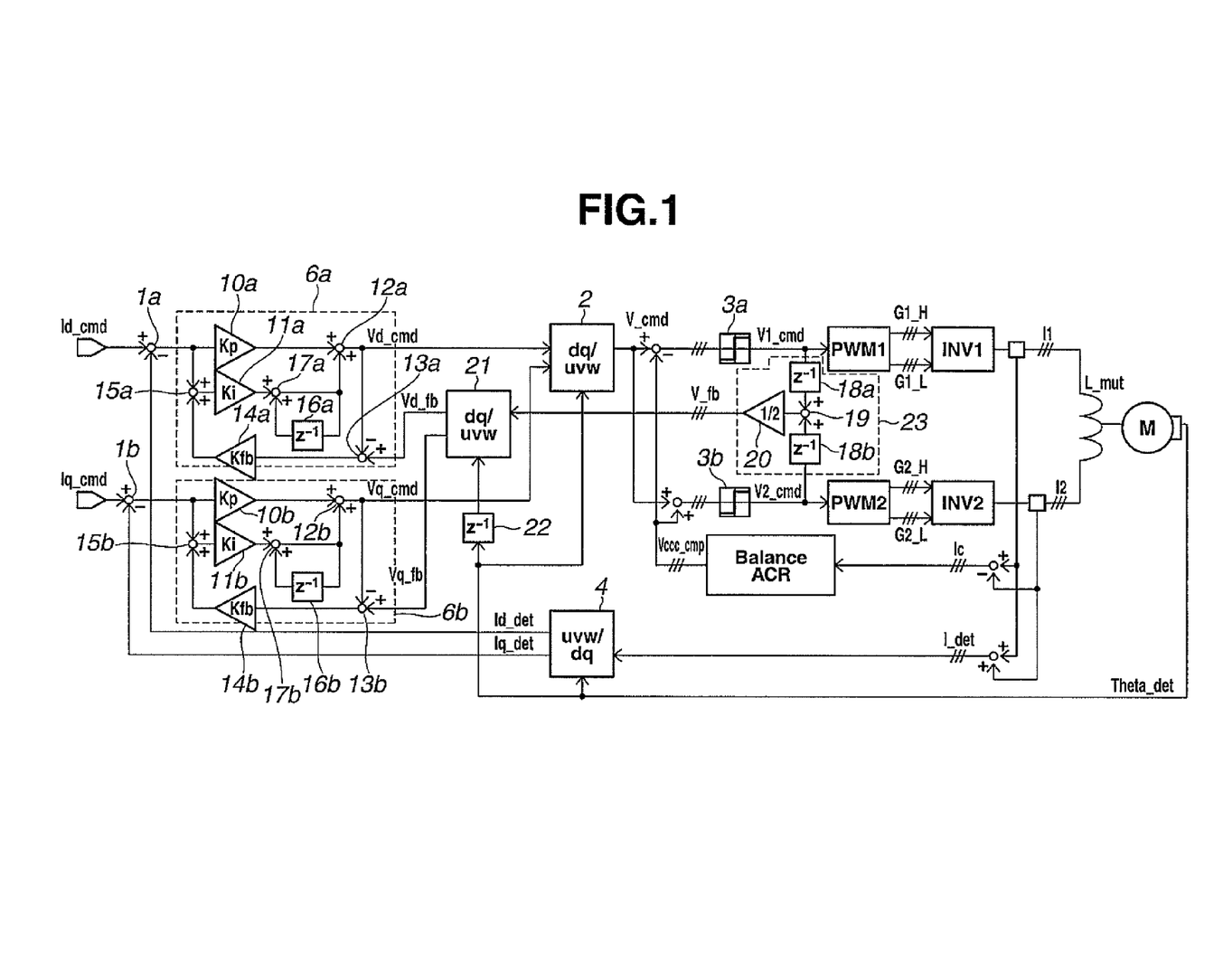
FIG. 1 is a block diagram showing a PWM power converter parallel running apparatus according to Embodiment 1.

FIG. 1 is a block diagram showing a PWM power converter parallel running apparatus according to Embodiment 1.

First, a subtracting section 1a determines a deviation of a d-axis current command value or quantity Id_cmd from a d-axis current detection value or quantity Id_det, and an output current control section 6a performs a PI control. Similarly, a subtracting section 1b determines a deviation of a q-axis current command value or quantity Iq_cmd from a q-axis current detection value or quantity Iq_det, and an output current control section 6b performs a PI control. A dq inverse transformer 2 inversely transforms voltage commands Vd_cmd and Vq_cmd which are outputs of the output current control sections 6a and 6b, into a voltage command V_cmd.

The dq transformation and the dq inverse transformation are expressed by a following mathematical expression (1). In the mathematical expression (1), θ represents a phase.

[Math. 1]

$$[C_{dq}] = \sqrt{\frac{2}{3}} \begin{bmatrix} \cos\theta & \sin\theta \\ -\sin\theta & \cos\theta \end{bmatrix} \cdot \begin{bmatrix} 1 & -1/2 & -1/2 \\ 0 & \sqrt{3}/2 & -\sqrt{3}/2 \end{bmatrix} \quad (1)$$

$$[C_{dq-inv}] = [C_{dq}]^{-1}$$

The cross current control is performed in the following manner. A cross current can be detected by obtaining a deviation or difference between an inverter current I1 and an inverter current I2. The detected cross current is denoted as Ic. The cross current Ic is converted, by a cross current compensating section BalanceACR (Automatic Current Regulator), into a cross current compensating command value or quantity Vccc_cmp. This cross current compensating command quantity Vccc_cmp is overlapped or superimposed on the voltage command V_cmd.

Cross current compensating section BalanceACR performs a proportional plus integral (PI) calculation of the deviation (cross current Ic) between output currents I1 and I2 of inverters INV1 and INV2, and thereby determines a cross current compensating command value or quantity Vccc_cmp which is the same in the unit as the voltage command quantity V_cmd common to inverters INV1 and INV2. This cross current compensating command value or quantity Vccc_cmp is added to, or subtracted from, the voltage command V_cmd after the dq inverse transformation so as to reduce the cross current Ic to zero. That is, a voltage command V_cmd−Vccc_cmp for inverter INV1 is determined by subtracting the cross current compensating command value Vccc_cmp from the voltage command V_cmd after the dq transformation, and a voltage command V_cmd+Vccc_cmp for inverter INV2 is determined by adding the cross current compensating command value Vccc_cmp to the voltage command V_cmd after the dq transformation. Thus, the voltage commands V_cmd−Vccc_cmp and V_cmd+Vccc_cmp for inverters INV1 and INV2 are adjusted to generate the deviation in the direction to prevent the cross current Ic, and hence the cross current is reduced.

The voltage command limiting sections 3a and 3b impose voltage command limitation on the voltage commands V_cmd−Vccc_cmp and V_cmd+Vccc_cmp for inverters INV1 and INV2, with output limit values of inverters INV1 and INV2, respectively. Voltage commands V1_cmd and V2_cmd are voltage commands after the voltage command limitation.

Then, PWM (Pulse Width Modulation) generating sections PWM1 and PWM2 perform PWM control with respect to the voltage commands V1_cmd and V2_cmd after the voltage command limitation, and thereby produce gate commands G1_H and G1_L for inverter INV1, and gate commands G2_H and G2_L for inverter INV2, respectively. PWM generating sections PWM1 and PWM2 are configured to produce the gate commands G1_H and G1_L and the gate commands G2_H and G2_L having a dead time Td for preventing a short circuit.

Each of output current control sections 6a and 6b includes a proportional calculating section 10a or 10b, an integral calculating section 11a or 11b, a buffer 16a or 16b, an adder 17a or 17b, an adder 12a or 12b, a subtracting section 13a or 13b, a multiplying section 14a or 14b, and an adding section 15a or 15b. The buffer 16a or 16b outputs the output of the integral calculating section 11a or 11b with a delay of one sampling period. The adder 17a or 17b adds the output of the integral calculating section 11a or 11b, and the output of the buffer 16a or 16b. The adder 12a or 12b adds the output of proportional calculating section 10a or 10b and the output of adder 17a or 17b. The subtracting section 13a or 13b calculates a saturation quantity of the operation quantity limited by the voltage command limiting section 3a or 3b, by subtracting the output of voltage command limiting section 3a or 3b from the output of adder 12a or 12b. The multiplying section 14a or 14b multiplies the saturation quantity of the operation quantity, by a feedback gain Kfb. The adding section 15a or 15b adds the output of multiplying section 14a or 14b, to the deviation between the current command value or quantity Id_cmd or Iq_cmd and the current detection value or quantity Id_det or Iq_det. In the output current control section 6a or 6b, Kp is a proportional gain, Ki is an integral gain and Kfb is the feedback gain.

In order to perform the anti-windup process properly, the feedback is performed by using a final value of the previous voltage command V1_cmd or V2_cmd.

In Embodiment 1, for reset windup measures, the difference between the output of adder 12a or 12b and the output of voltage command limiting section 3a or 3b, that is the saturation quantity of the operation quantity limited by voltage command limiting section 3a or 3b, is fed back to the input side of output current control section 6a or 6b.

However, it is necessary to subtract the dq inverse transformation and the cross current compensation, for the feedback to the output current control section 6a or 6b.

Voltage commands V1_cmd and V2_cmd are expressed by a following mathematical expression (2).

$$V1\_cmd = V\_cmd - Vccc\_cmp \quad \text{[Math. 2]}$$

$$V2\_cmd = V\_cmd + Vccc\_cmp \quad (2)$$

Cross current compensating command value or quantity Vccc_cmp can be subtracted from voltage command V_cmd as expressed by a following mathematical expression (3).

[Math. 3]

$$\begin{aligned}
V\_fb(n) &= \{V1\_cmd(n-1) + V2\_cmd(n-1)\}/2 \quad (3)\\
&= \{V\_cmd(n-1) - Vcc\_cmp(n-1) + V\_cmd(n-1) + \\
&\quad Vcc\_cmp(n-1)\}/2 \\
&= V\_cmd(n-1)
\end{aligned}$$

※ expressed by a discrete system.

More specifically, as shown in FIG. 1, buffers 18a and 18b of a feedback quantity calculating section or feedback value calculating section 23 output the voltage commands V1_cmd and V2_cmd with a delay of one sampling period, an adder 19 adds the outputs of buffers 18a and 18b, and a divider 20 divides the sum by two, and thereby calculates, as a feedback value or quantity V_fb, an average of the voltage commands after the output limitation.

A dq transforming section 21 obtains a d-axis feedback value or quantity Vd_fb and a q-axis feedback value or quantity Vq_fb, by the dq transformation of feedback value or quantity V_fb. A quantity resulting from multiplication, by a feedback gain Kfb, of a deviation between the d-axis voltage command Vd_cmd and the d-axis feedback quantity Vd_fd is added to the deviation between the d-axis current command Id_cmd and the d-axis current detection quantity Id_det, and the sum obtained by this addition is inputted to the d-axis integrator or integrating section 11a. Furthermore, a quantity resulting from multiplication, by a feedback gain Kfb, of a deviation between the q-axis voltage command Vq_cmd and the q-axis feedback quantity Vq_fd is added to the deviation between the q-axis current command Iq_cmd and the q-axis current detection quantity Id_det, and the sum obtained by this addition is input to the q-axis integrator or integrating section 11b. With this configuration, this system can achieve the auto adjusting PI control taking, into consideration, the dq transformation and the cross current compensation.

The phase Theta_det of electric motor M is outputted from a buffer 22 with a delay of one sampling period, into the dq transforming section 21. Moreover, the voltage command liming sections 7a and 7b shown in FIG. 7 are omitted. As in FIG. 5, an output current I_det of the overall system is measured by detecting the inverter output currents I1 and I2, and adding the detected inverter output currents. Since the output current I_det is a three-phase current, a dq transformer 4 is arranged to output current detection quantities Id_det and Iq_det by performing the dq transformation for performing the output current control. For this dq transformation, the dq transformer 4 uses the phase Theta_det detected by a sensor such as an encoder.

As explained above, the thus-constructed PWM power converter parallel running apparatus according to Embodiment 1 can perform the cross current compensation and perform the anti-windup operation properly even in case of voltage saturation. Specifically, it is possible to perform the anti-windup control normally because a voltage saturation is not generated even if the cross current compensating command quantity Vccc_cmd is superposed on the voltage command V_cmd after the conversion to the three-phase voltage.

As a result, this apparatus prevents occurrence of unwanted current vibrations or oscillation, and torque vibration is not produced because of the absence of current vibrations. Furthermore, because of exemption from torque vibration, it is possible to use a mechanical system without damage even if the mechanical system has a resonance frequency.

Embodiment 2

A PWM power converter parallel running apparatus according to Embodiment 2 is arranged to perform a zero phase modulation to increase a voltage output range unlike the PWM power converter running apparatus according to Embodiment 1.

Figure 2:
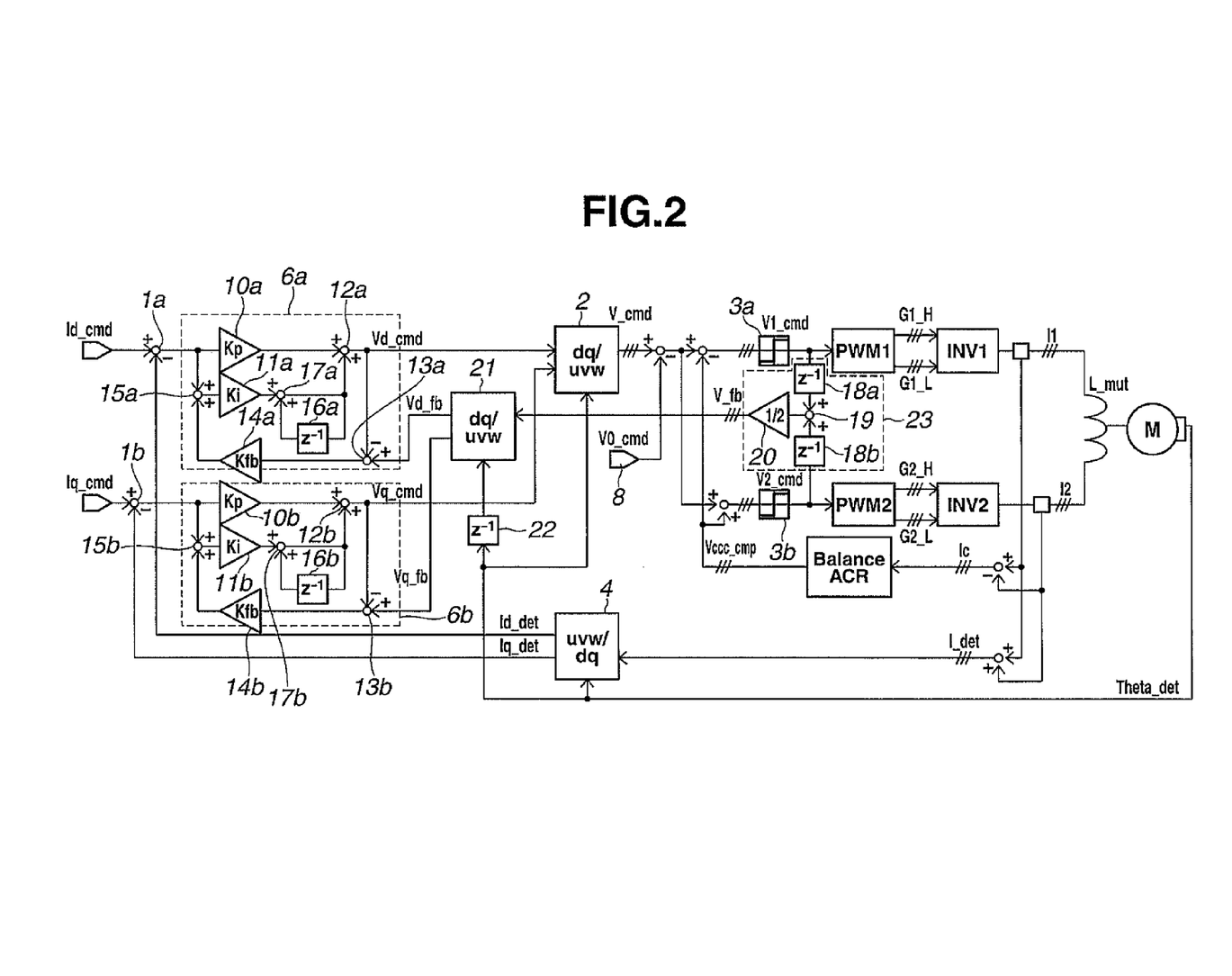
FIG. 2 is a block diagram showing a PWM power converter parallel running apparatus according to Embodiment 2.

FIG. 2 is a block diagram showing the PWM power converter parallel running apparatus according to Embodiment 2. Among various methods proposed as the zero-phase modulation, the following explanation employs, as an example, a method of Patent Document 2. The voltage command V_cmd of each phase is subjected to subtraction of a zero-phase voltage command V0_cmd which is a sine wave having a frequency equaling a triple of a frequency of a fundamental wave. In the example of FIG. 2, the cross current compensation is performed after the subtraction of the zero-phase voltage command V0_cmd from the voltage command V_cmd. The d-axis and q-axis feedback quantities Vd_fb and Vq_fb can be determined in the same operation as in Embodiment 1. The d-axis and q-axis feedback quantities Vd_fb and Vq_fb are quantities independent mathematically from the zero-phase voltage, so that these can be, utilized without problem.

As explained above, the PWM power converter parallel running apparatus according to Embodiment 2 can perform the anti-wind-up control properly without interference of the anti-windup control with the cross current compensation and the zero phase compensation, prevent current oscillation and torque vibrations, and enable the use of a mechanical system safely without damage even if the mechanical system has a resonance frequency. Moreover, it is possible to decrease a peak value of the voltage command and increase a fundamental wave component of the output voltage.

Embodiment 3

A PWM power converter parallel running apparatus according to Embodiment 3 is arranged to add a dead time compensation to the PWM power converter running apparatus according to Embodiment 2.

Figure 4:
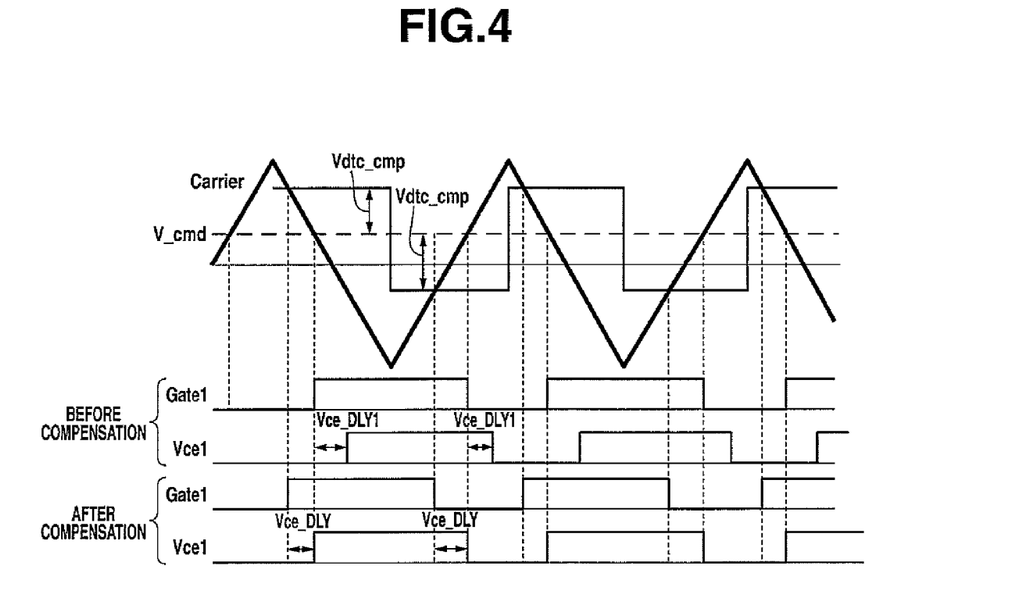
FIG. 4 is a graphic view showing a time chart of a dead time compensation in Embodiment 3.

For explanation of the dead time compensation, FIG. 4 shows a time chart of the dead time compensation. FIG. 4 shows the time chart of inverter INV1 only. First, an error time measurement value or quantity Vce_DLY1 is a value determined by measurement between the gate command Gate1 and an inverter phase voltage detection value or quantity Vce1 at the on time and the off time. In order to use the error time measurement quantity Vce_DLY1 for the dead time compensation, a dead time compensating section 9 obtains a dead time compensating voltage Vdtc_cmp1 [p.u.] which is a quantity obtained by converting the error time measurement quantity Vce_DLY1 to the form in the unit (voltage) identical to the unit of the voltage command quantity V_cmd [p.u.]. This dead time compensating voltage Vdtc_cmp1 can be determined by calculation according to a following mathematical expression (4) in the case in which a half amplitude of a carrier signal generated by a carrier generating section (not shown) of the PWM control is 1 [p.u.], and a carrier frequency is Fc [Hz].

[Math. 4]

$$Vdtc1[p.u.]=2\times Vce\_DLY1[s]\times 2Fc[Hz] \qquad (4)$$

Similarly, the dead time compensating section 9 measures an error time measurement value or quantity Vce_DLY2 between the gate command Gate2 and an inverter phase voltage detection quantity Vce2 at the on time and the off time, and obtains a dead time compensating voltage Vdtc_cmp2. Furthermore, since the quantity Vce_DLY are measured for two of the inverters, the dead time compensating section 9 determines an average of the dead time compensating voltages Vdtc_cmp1 and Vdtc_comp2, and outputs the average as dead time compensating voltage Vdtc_cmp.

The dead time compensating voltage Vdtc_cmp outputted from dead time compensating section 9 is superimposed on the voltage command V_cmd after the dq transformation, to make the gate command Gate1 before the dead time compensation, calculated in the PWM generating section PWM1 and the inverter phase voltage detection quantity Vce1 after the compensation match with each other. This superimposition is addition or subtraction to the voltage command (V_cmd) common to the PWM generating sections PWM1 and PWM2 in dependence on the polarity of ON/OFF of the next PWM control. For example, the dead time compensating voltage Vdtc_cmp of the on time is added during a decent of the PWM carrier, and the dead time compensating voltage Vdtc_cmp of the off time is subtracted during an ascent of the PWM carrier.

This configuration enables the dead time compensation causing the gate command Gate1 before the dead time compensation and the inverter phase voltage detection voltage Vce1 after the compensation to match with each other, and reducing the error therebetween almost to zero. In accordance with gate commands Gate1 and Gate 2, the PWM generating sections PWM1 and PWM2 output the switching commands G1_H, G1_L, G2_H and G2_L including the dead time.

Figure 3:
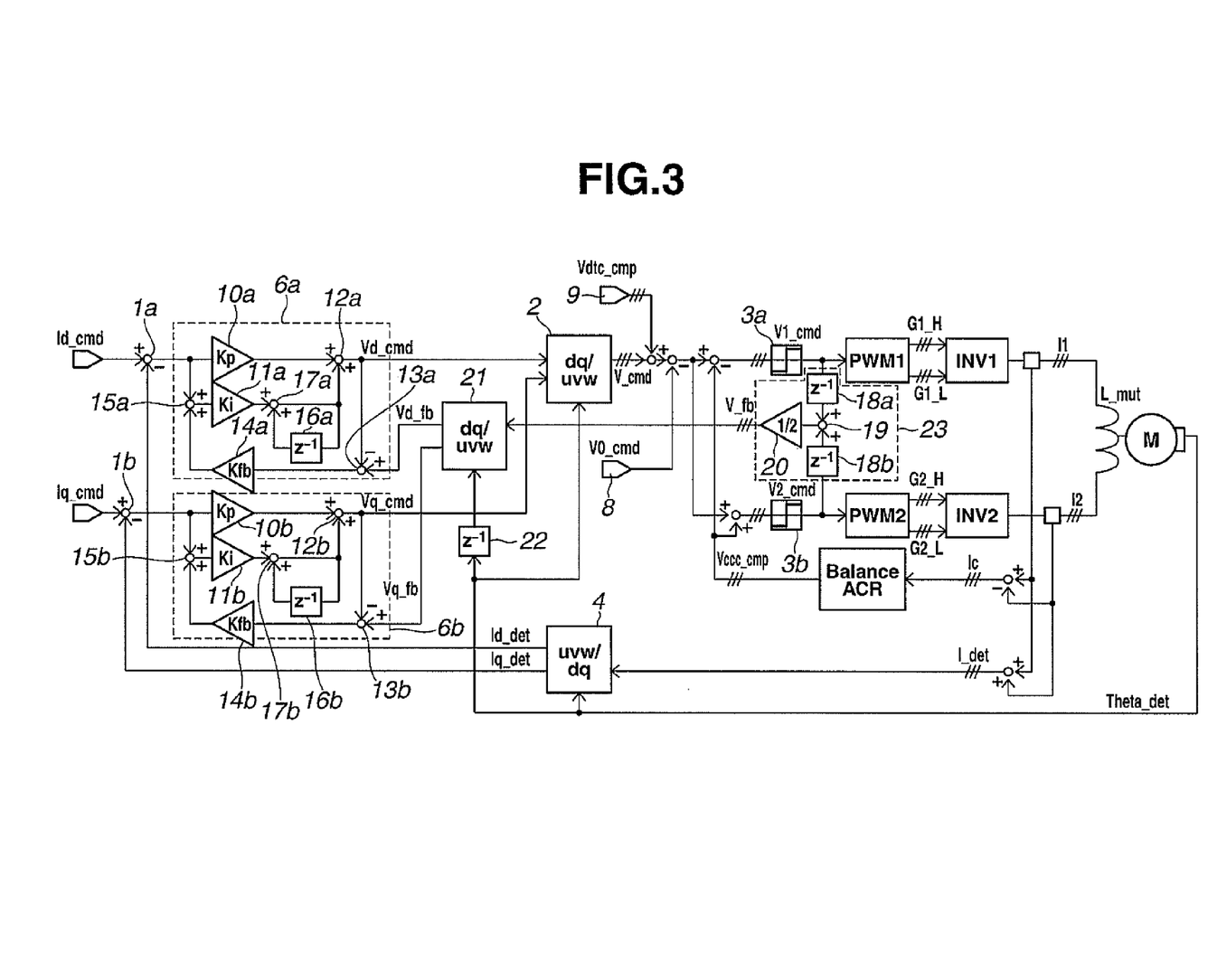
FIG. 3 is a block diagram showing a PWM power converter parallel running apparatus according to Embodiment 3.

After the addition of the dead time compensating quantity Vdtc_comp to the voltage command V_cmd, the system of FIG. 3 performs the zero phase modulation like Embodiment 2, and further performs the cross current compensation. The d-axis and q-axis feedback quantities Vd_fb and Vq_fb can be calculated in the same manner as in Embodiment 1. The three-phase dead time compensating quantities Vdc_cmp are almost the same except for the vicinity of the crossing of the output currents, and therefore, almost cancelled out by the zero phase adjustment at the later stage. Thus, the d-axis and q-axis feedback quantities Vd_fb and Vq_fb include error more or less, but they can be used without problems.

As explained above, the PWM power converter parallel running apparatus according to Embodiment 3 prevents interference with the cross current compensation, the zero phase modulation and the dead time compensation even in case of voltage saturation. Therefore, the PWM power converter parallel running apparatus according to Embodiment 3 can perform the anti-windup control properly, prevent undesired current oscillation and torque vibrations, and thereby allow the use of the mechanical system without damage even if the mechanical system has a resonance frequency.

With the dead time compensation, the system can reduce the error between the gate command Gate1 before the dead time compensation and the inverter phase voltage detection quantity Vce after the dead time compensation almost to zero, and eliminate the delay time DTC_DLY after the dead time compensation. By so doing, the system can decrease the limitation of the minimum on pulse time, and enable generation of minuter PWM pulses. With the capability of producing minuter PWM pukes, the system can increase the greatest output voltage of the power converter such as the inverter. Moreover, with the reduced dead time of the PWM inverter, the system can improve the response of the current control and frequency control. Furthermore, with the superimposition of the dead time compensating quantity on the voltage command, the system can prevent pulse missing at the time of dead time generation.

Moreover, the system can decrease a 6$f$ component of the output current, with the dead time compensation. With the dead time compensation according to Embodiment 3, the system can reduce strain or deformation of the current.

With no interference with the cross current compensating function, the zero phase modulation and the dead time compensation even in the case of voltage saturation, the system can perform the anti-windup control properly, prevent the current oscillation and toque vibration, and enable the use of a mechanical system without damage even if a resonance frequency is involved in the mechanical system.

Although the invention has been described in detail above by reference to certain concrete examples, the invention is not limited to the examples described above. Various variations and modifications are possible, as evident to the person skilled in the art, within the purview of the technical concept of the present invention. These various variations and modification are within the scope of the claims.

The invention claimed is:

1. A PWM power converter parallel running apparatus for synchronously operating a plurality of PWM power converters whose outputs are connected in parallel, the PWM power converter parallel running apparatus comprising:
    a current control section to perform an integral calculation of a deviation between a current command value and a current detection value, and to output a voltage command;
    a cross current compensating section to perform across current compensation to the voltage command in accordance with a deviation of output currents of the PWM power converters, and to output a voltage command of each PWM power converter;
    a voltage command limiting section to impose output limitation on the voltage command of each PWM power converter; and
    a feedback value calculating section to calculate an average of the voltage commands after the output limitation, as a feedback value;
    the current control section being arranged to use, as the deviation used for the integral calculation, a sum obtained by addition, to the deviation between the current command value and the current detection value, of a product obtained by multiplying, by a feedback gain, a saturation quantity of an operation quantity limited by the voltage command limiting section which is a deviation between the feedback value and the voltage command.

2. The PWM power converter parallelrunning apparatus as recited in claim 1, wherein a zero phase voltage is subtracted from the voltage command.

3. The PWM power converter parallelrunning apparatus as recited in claim 1, wherein a dead time compensating value is added to the voltage command.

4. The PWM power converter parallelrunning apparatus as recited in claim 2, wherein a dead time compensating value is added to the voltage command.

* * * * *